April 18, 1950     R. E. SHARPES     2,504,737
SELF-OPERATING PITCH CHANGING PROPELLER
AND CONTROL THEREFOR
Filed Sept. 7, 1944     5 Sheets-Sheet 3
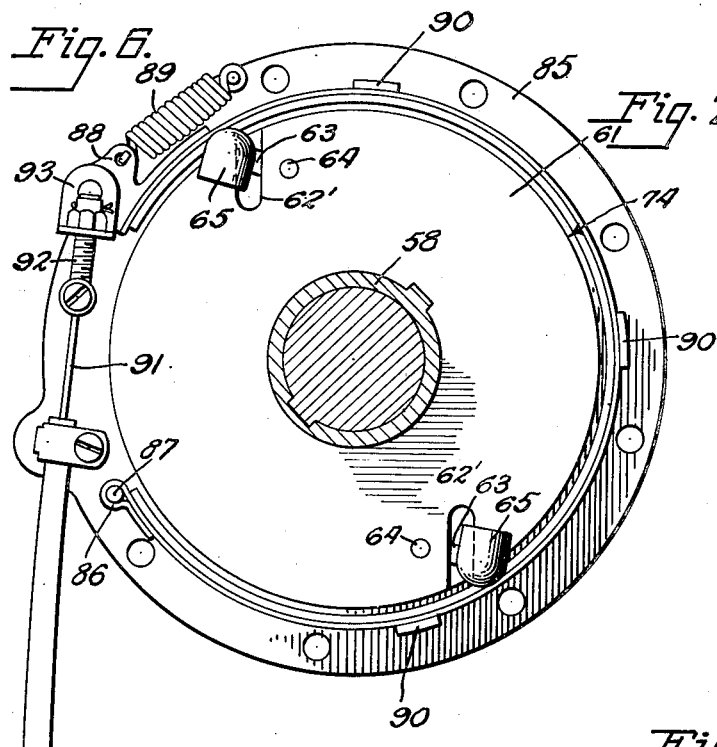
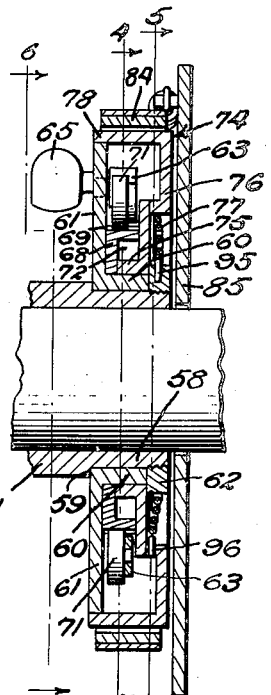
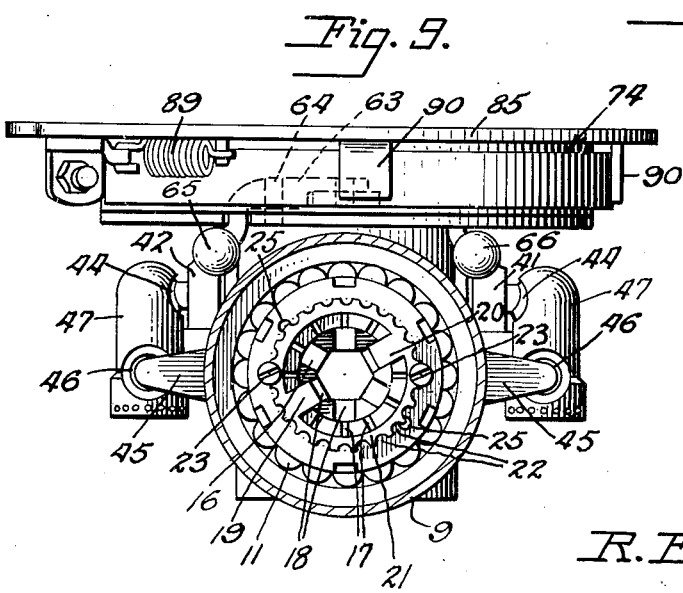
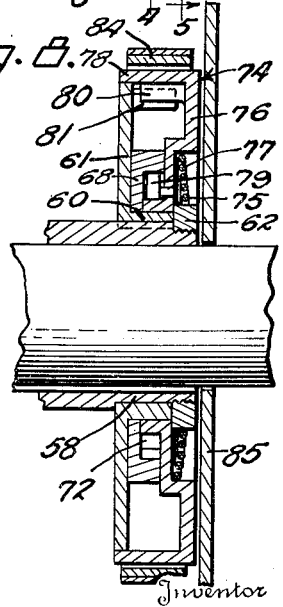
Inventor
R. E. Sharpes
By Mason, Fenwick & Lawrence
Attorneys

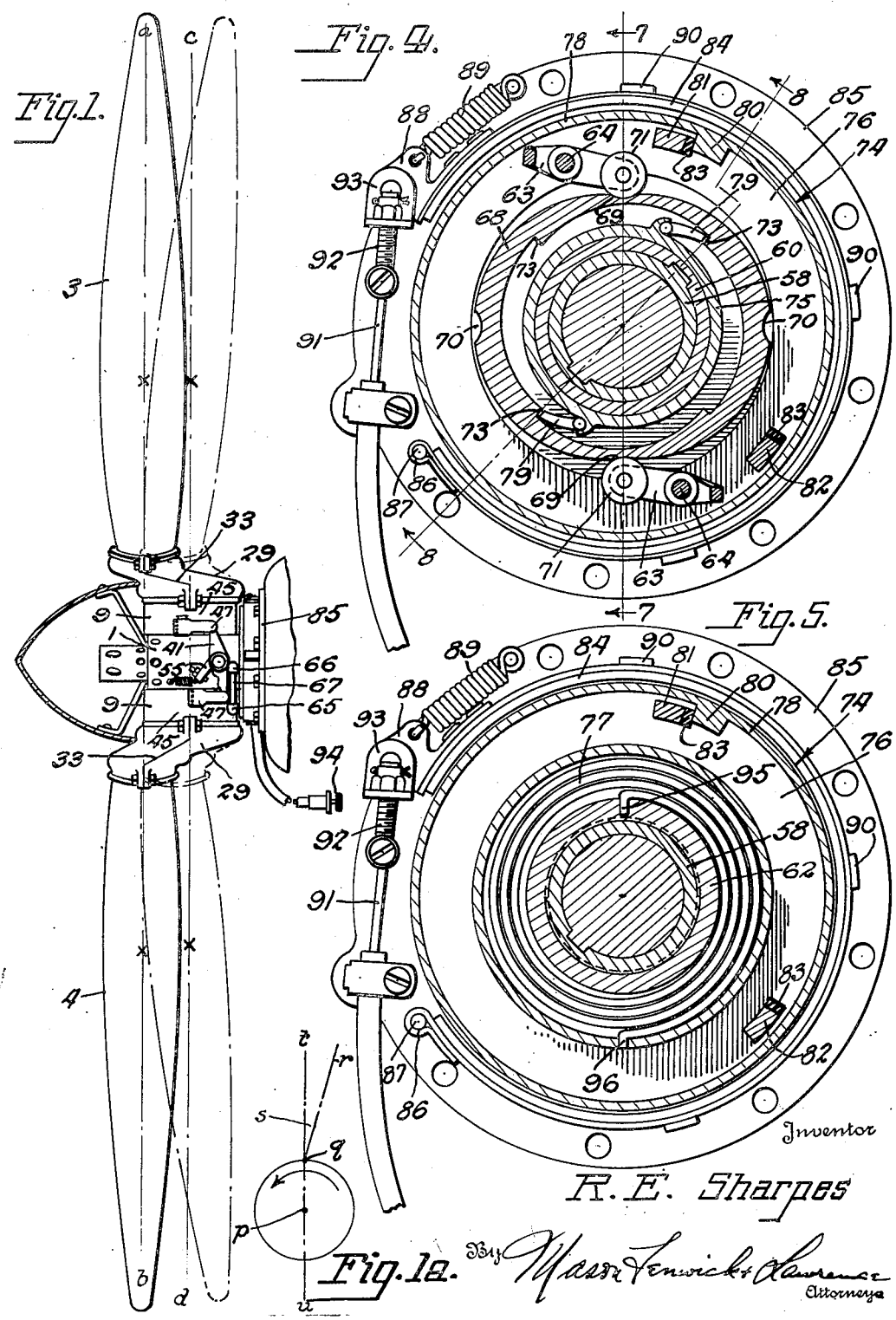

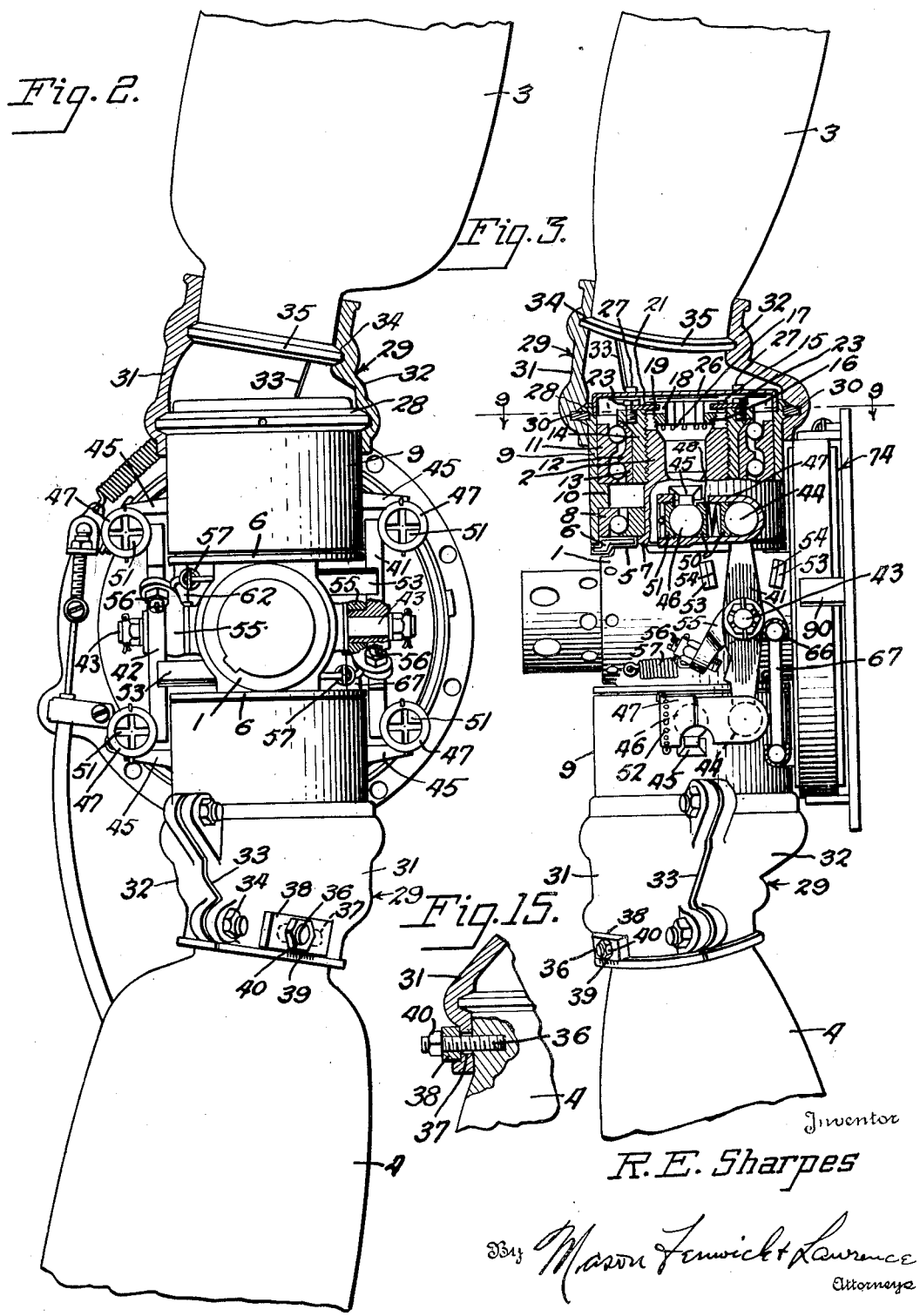

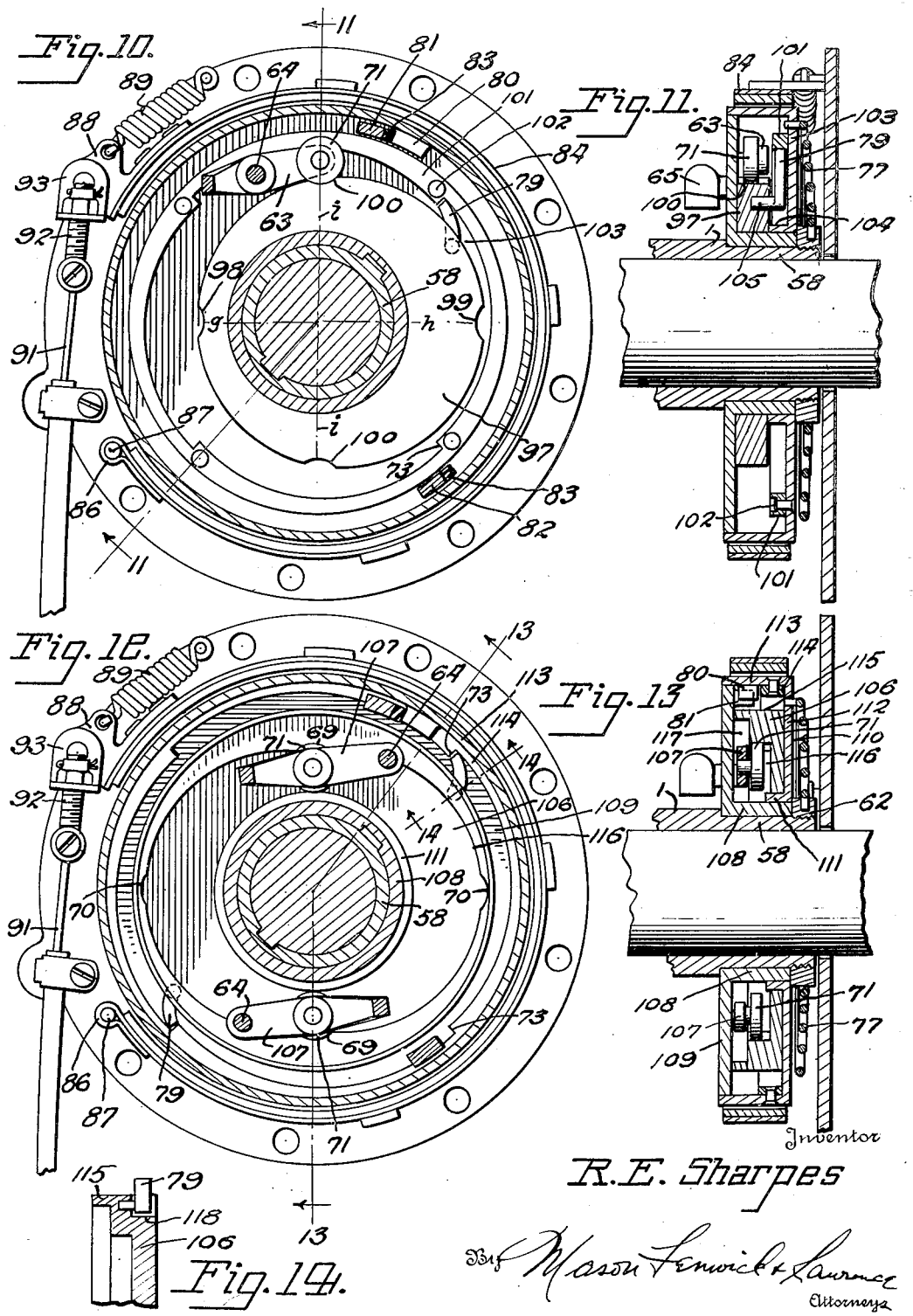

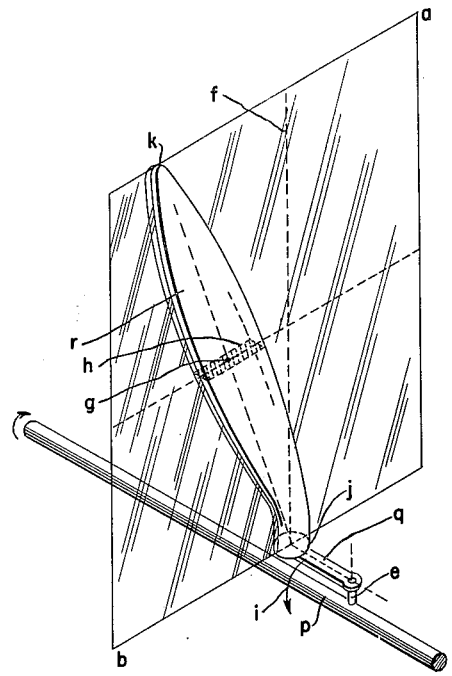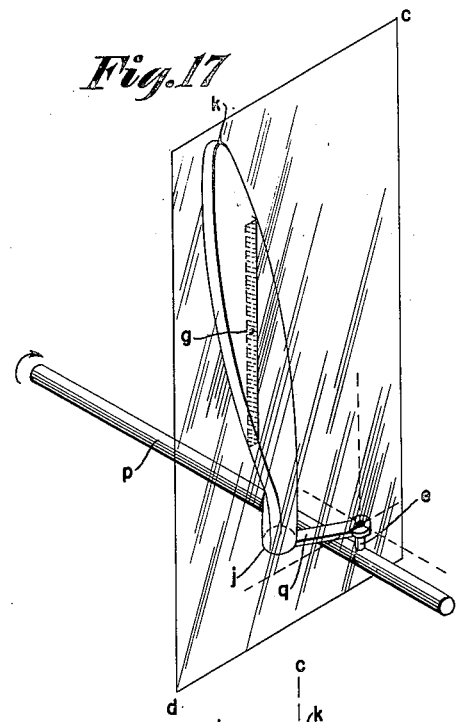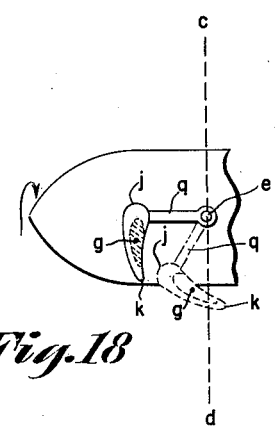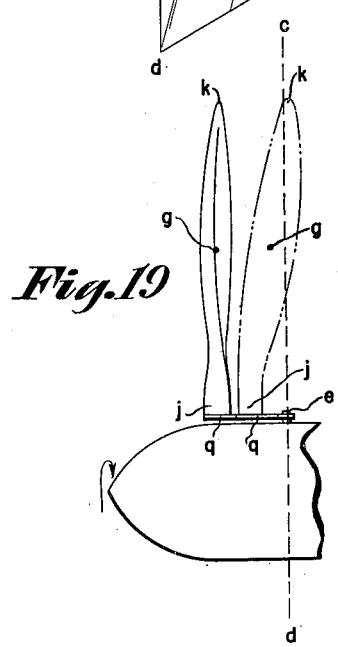

Patented Apr. 18, 1950

2,504,737

UNITED STATES PATENT OFFICE 2,504,737

SELF-OPERATING PITCH CHANGING PROPELLER AND CONTROL THEREFOR

Roy E. Sharpes, Harrisonburg, Va.

Application September 7, 1944, Serial No. 553,061

4 Claims. (Cl. 170—160.1)

This invention relates to aircraft propellers, both of the self-operating and controllable pitch types.

One of the objects of the invention is the provision of an improved propeller of that type which automatically changes pitch responsive to variations in the resultant of the aerodynamic and other forces acting upon the propeller when rotating.

Another object of the invention is to provide a propeller of the class described, the blades of which are each mounted to swing in a small orbit about a radial axis perpendicular to the axis of rotation of the propeller wherein the blade substantially throughout its working range is in such position as to be intersected at some point between the root end and tip by a plane perpendicular to the axis of rotation of the propeller which embraces the axis of swing of the blade, in which position the blade responds with maximum sensitiveness to thrust variations, while at the same time the component of torque acting upon the blade is minimized.

More specifically, the object of the invention is to provide a self operating pitch changing propeller, the blades of which are each swingably mounted about an axis perpendicular to the axis of rotation of the propeller, at the end of a crank arm having a working range limited to a relatively small arc forwardly of a plane perpendicular to the axis of rotation of the propeller and embracing the axis of swing and close thereto, the neutral axis of the blade being in a plane perpendicular to said crank arm and inclined with respect to a line in said last named plane drawn from the end of said crank arm parallel to the axis of swing of said crank arm, in a direction contra to the direction of rotation of the propeller, whereby the blade substantially throughout its working range is in such a position that some point of the major portion of the airfoil area of the blade, which may be considered the effective area, is intersected by said plane.

The forces which determine the working position of a blade of this type are centrifugal force, which swings the blade backward, increasing the pitch, and the load thrust, which tends to swing the blade forward, decreasing the pitch. Contributing forces affecting the position of the blades are the twisting moment of the blades which tends to flatten the pitch and the torque thrust, which tends to increase the pitch. The main forces, however, are centrifugal force and the load thrust.

At any given R. P. M., the angle of attack of the blades will be determined by the resultant of the forces acting on the blades. This resultant force will vary as the speed of the plane increases or decreases. And the angle of the blades will be made to vary accordingly. As the speed of the plane increases, the angle of attack of the blades increases, which tends to keep the R. P. M. of the motor from increasing. Then when the speed of the plane decreases, the angle of attack of the blades decreases, thus tending to prevent decrease in the R. P. M. of the motor. Therefore, the R. P. M. will be held practically constant at various air speeds of the plane.

Since there are times, for example, at taking off or preparatory to landing, when it is desirable to increase the R. P. M. of the motor, the propeller of the present invention meets these demands for increasing R. P. M. by embodying means whereby it may be shifted into or out of a position in which the R. P. M. will be increased. This is of definite advantage, since the ideal cruising R. P. M. is much lower than that for ideal take-off.

Another object of the invention, therefore, is the provision of means, operable at will to inhibit the swing of the blades to the full limit of their automatic range or to swing the blades to positions beyond the limits of their automatic range, which may be toward either the high or low pitch extremes. By preference, the embodiment herein described is more specifically to move the blades into the low pitch extremes, whereby the R. P. M. of the motor is automatically increased. This phase of the invention is equally adaptable for controlling the pitch on any change pitch propeller, whether self-operable or controllable, where the blades are held toward either the high or low pitch limits by any flexible force such as springs, centrifugal force, air pressure, etc.

Another object of the invention is to provide a propeller of the class described, the blades of which are biased flexibly in either high or low pitch direction toward or against a movable limiting means, with means for shifting said limiting means in either direction to modify the range of movement of said blades.

Other objects of the invention will appear as the following description of a preferred and practical embodiment thereof proceeds.

In the drawings which accompany and form a part of the following specification, and throughout the figures of which the same reference numerals have been used to denote identical parts:

Figure 1 is a side view of a propeller, incorporating the principles of the invention, the broken lines showing the blades in a working position, the full lines showing the blades swung to an extreme forward position, which they may not assume when operating;

Figure 1a is a diagram showing the direction of inclination of the propeller blade;

Figure 2 is a front view of the propeller, the blades being in an intermediate working position, partly in section, parts being omitted and the blade being broken away;

Figure 3 is a side view of Figure 2, parts being in section;

Figure 4 is a section taken along the line 4—4 of Figure 7;

Figure 5 is a section taken along the line 5—5 of Figure 7;

Figure 6 is a section taken along the line 6—6 of Figure 7;

Figure 7 is a sectional view taken along the line 7—7 of Figure 4;

Figure 8 is a section taken along the line 8—8 of Figure 4;

Figure 9 is a section taken along the line 9—9 of Figure 3;

Figure 10 is a view similar to Figure 4, showing a modification of the pitch control means;

Figure 11 is a section taken along the line 11—11 of Figure 10;

Figure 12 is a view similar to Figure 4, showing a forward modification of the pitch control means;

Figure 13 is a section taken along the line 13—13 of Figure 12;

Figure 14 is a section taken along the line 14—14 of Figure 12;

Figure 15 is a detail view in section, showing the attachment of the root of the blade to one of the divided parts of the blade fitting;

Figures 16 and 17 are diagrammatic views in perspective showing limit positions of the blades assumed respectively under aerodynamic force and centrifugal force;

Figure 18 is a diagrammatic plan view showing the blade in extreme forward position and a working position;

Figure 19 is a similar side view.

Referring now to the drawings, the embodiment of the invention therein illustrated comprises the hub 1 having the stub shafts 2, one for each blade, the stub shafts and the appurtenant mounting structure being identical for both blades.

The blades 3 and 4 are each mounted in an offset position with respect to the axes of the respective stub shafts and may therefore be regarded as being at the ends of crank arms pivoted about said stub shafts.

Figure 1, in full lines, shows a position of the blades with the crank arms swung to a forward position in which the crank radii are parallel to the hub axis. It is to be understood that this is not a position which the blades would ever assume in normal operation, but is a hypothetical position which they would assume if acted upon solely by aerodynamic force. Considered from the standpoint of this position, the neutral axes are inclined in a plane perpendicular to the crank arm at small angles to the true radial direction, in a direction contra to the direction of rotation of the propeller. This is illustrated diagrammatically in Figure 1a, in which the propeller in the full line position of Figure 1 is viewed from the front. The reference $p$ is the axis of the hub; $q$ the front end of the crank arm, pivoted at its rear end to the stub shaft; $r$ the blade mounted at the front end of the crank arm at a small angle $s$ to a line drawn from the end of the crank arm parallel to the stub shaft, in a direction contra to the direction of rotation of the propeller, indicated by the arrow.

This can be best explained by reference to the diagrammatic views in Figures 16, 18 and 19. In Figure 16, $p$ represents the axis of rotation of the propeller, which rotates counterclockwise, viewed from the front, as indicated by the curved arrow, $e$ the axis of swing of the blade, perpendicular to the axis of rotation, and $q$ the crank arm swingable about the axis $e$.

The crank arm $q$ is shown extending forwardly parallel to the axis of rotation $p$. The propeller blade $r$ is fixed to the front end of the crank arm. $a, b$ is a plane perpendicular to the axis of rotation $p$ and embracing the neutral axis of the blade. The line $f$ in said plane is drawn from the front end of the crank arm parallel to the axis $e$. The blade $r$ is inclined away from this line in a direction contra to the direction of rotation of the axis $p$. The center of gravity $g$ of the blade is in plane $a, b$. An airfoil cross-section $h$ is shown at the center of gravity. The flat face of the airfoil is parallel to the plane of rotation, that is, it has no angle of attack. This is the position which the blade would take if acted upon solely by aerodynamic force.

Now assuming that the axis $p$ begins to rotate in the direction of the curved arrow, this will carry the axis $e$ to the right, but the inertia of the blade will cause it to resist rotation so that as the pivoted end of the crank moves forward, the free end of the crank, together with the blade, will swing to the left, as indicated by the arrow $i$. Centrifugal force acts to swing the blade in the direction of the arrow, since the center of gravity $g$ is closer to the axis of rotation $p$ when the blade is in the position shown in Figure 16 than when the blade is in any laterally swung position, and centrifugal force will throw the center of gravity as far as possible from the axis of rotation.

Figure 17 shows the plane $c, d$ perpendicular to the axis of rotation of the propeller and embracing the axis of swing $e$. The crank arm $q$ is in laterally swung position. The neutral axis of the blade $i$ is in a plane perpendicular to the crank arm. The blade is shown with its center of gravity in the plane $c, d$. This is as far as the blade can be swung by centrifugal force, for as soon as the center of gravity passes out of the plane, $c, d$, it comes closer to the axis $p$.

Since the blade is inclined, when the center of gravity is in the plane $c, d$, the root end $j$ will be forward of said plane and the tip rearward of said plane. The crank arm $q$ will make a small angle with said plane forwardly thereof. The flat face of the airfoil is nearly perpendicular to the plane of rotation of the propeller.

Figures 18 and 19 are respectively top and side views showing the blade in full lines in the position shown in Figure 16, and in broken lines showing a typical working position of the blade. $j, g$ and $k$ represent, respectively, root end, center of gravity, and tip. The center of gravity in the broken line position is forward of the plane $c, d$ and the airfoil section shows a steep angle of attack. The plane $c, d$ still intersects the blade in its effective area, that is, between the root end and tip. This position of the blade is determined by the resultant of the principal forces acting upon the blade, centrifugal, at times to move the center of gravity into the plane $c, d$, and the aerodynamic thrust which tends to move it in a forward direction. Centrifugal force is assisted somewhat by the torque which also tends to swing the blade toward the plane c, d. Since automatic pitch change results in substantial constancy of R. P. M., the centrifugal force is substantially constant so that the position of the blades is dependent upon variations of the load thrust, which changes with the speed of the airplane.

The broken line position of the blade shown in Figure 18 represents an intermediate position in the normal working range. It is obvious that in the diagrammatic views, the length of the crank arm has been greatly exaggerated. It will be readily understood by comparing the length of the crank arm q in full line position, and its projected length in broken line position, that the torque stress which is the rotative reaction of the blade acting upon the free end of the crank arm as a lever, is minimized when the working range of the blades is close to the plane c, d, as shown. Since the force acting to move the center of gravity toward the plane c, d should be constant and it is desirable that the only variable be the load thrust resulting from the speed of the airplane, it is important that the torque force which is variable and therefore a disturbing factor, should be kept as small as possible.

In self-operating pitch changing propellers, such for example as that disclosed in the patent to I. H. Driggs, No. 2,192,034, granted February 27, 1940, in which the working range of the blades is forwardly of a diametrical plane through the pivotal axes of the blades, the torque is a substantial factor in determining the position of the blades, since it acts through a lever arm equal to the distance of the effective areas of the blades from said diametrical or neutral plane.

By contrast to this, the design and construction of the subject invention disposes the working positions of the blades within a range throughout which the torque acts through substantially a short lever arm and its turning effect upon the blades is minimized.

This is accomplished by mounting the blades offset forwardly of said diametrical plane, at such distance therefrom and inclining the blades at such an angle, as to cause the blades to move through a limited working range in which the center of gravity has a small range of movement forwardly of said plane and the neutral axes of the blades has a range of movement throughout which they intersect said plane. This may throw the tips of the blades to the rear of said plane but their effect is inconsequential.

Proceeding now to a detailed description of the illustrated embodiment of the invention, it being understood that the structure is identical for each blade, the stub shaft 2 has a shoulder 5 on which the sealing washer 6 is located. The stub shaft 2 has a second shoulder 7, which supports the inner bearing 8. The bearing 8 is encased within a bearing housing 9 having an internal collar 10, which rests upon the bearing 8. An outer double thrust bearing 11 is encased within the upper part of the bearing housing 9 and rests upon the collar 10. This double thrust bearing includes a cone 12 which may be an integral member screwed upon the outer end of the stub shaft 2, but since practical difficulty may be encountered in threading a hardened cone, it is here shown as being formed in two parts, the outer hardened part 13 which the balls engage, and an inner part 14 which carries the threads.

The inner part 14 has an outwardly flared end which overlies the outer part 13 and retains it.

The stub shaft 2 is hollow at its outer end and terminates in a tapered threaded bore 15 receiving the tapered expanding plug 16. Expansion of the outer end of the stub shaft 2 is made possible by means of the slots 17. The expanding plug 16 has recesses 18 in its outer end to receive the tabs 19 and 20 (see particularly Figure 9), of the locking washer 21. The tabs 19 and 20 of the locking washer 21 are also received in recesses at the end of the stub shaft 2.

Said locking washer is provided with a series of peripheral arcuate recesses 22, by which the locking washer is securely locked to the inner part 14 of the cone 12 by screws 23, which are received in the threaded openings 24 in the inner cone part 14. In order to secure a finer adjustment than that provided by the spacing of the arcuate recesses, the part 14 of the cone may be provided with the additional threaded screw holes 25 positioned half way between the space intervals of the recesses 22 determined by the screws 23. Any existing looseness between the cone 12 and stub shaft is taken up by adjusting the expanding plug 16, and the locking washer 21 affords positive locking means for both the cone and the plug. The screws 23 preferably have apertures through the heads thereof, not shown, by means of which they may be locked with wire. It will be obvious that the centrifugal thrust of the blade 3 through the collar 10 of the bearing housing 9 is absorbed through the double bearing 11 and stub shaft 2, to which the cone of said bearing is screwed. The construction of the bearing is such that in assembling the same the lower series of balls may be arranged against the cup member and the upper series of balls against the cone, and the two portions of the bearing slidably telescoped whereby the balls are retained in the position shown.

The outward end of the housing 9 is completely sealed by the cap cover 26 which has a threaded peripheral flange screwed into the housing 9. Said cap has wrench lugs 27, by means of which it may be removed or tightened. The cap prevents any lubricant from the bearing housing 9 being thrown out by centrifugal force. The outer end portion of the bearing housing 9 is provided with an outwardly extending flange 28, adapted to be engaged by a corresponding channel in the split blade fitting 29. Dial pins 30 are employed, seated in recesses in the flange 28 and in corresponding recesses in the halves 31 and 32 of the blade fitting, to ensure the correct positioning of these parts when assembled.

The blade fitting 29 is provided at its lower end with a bore coaxial with the stub shaft 2 and at its upper end with a bore offset with respect to the axis of the stub shaft 2, and on an axis inclined to that of the stub shaft 2. In view of the offset relation of the bores in the lower and upper ends of the blade fitting 29, said fitting is divided in the offset manner illustrated at 33 in Figures 1 and 3. The blade fitting 29 is also provided with a channel 34 coaxial with the bore in its upper end adapted to receive and surround a corresponding peripheral flange 35 projecting from the lower end of the shank of the blade 3.

A stud 36 projects through a circumferentially arcuate slot 37 in the part 31 of the blade fitting, and through a close fitting hole in an index plate 38 which moves with reference to a scale 39 on the adjacent portion of the part 31. A nut 40 on the stud 36 enables the blade to be locked to the part 31 so that the blade fitting may be removed from the housing 9 for bearing adjusting, etc., and then replaced without disturbing the pitch adjustment of the blades. The sliding index plate 38 and scale 39 permit the optimum pitch adjustment to be initially made after trial by flight.

Automatic pitch change is made uniform for both blades by means of pitch equalizing levers 41 and 42 pivoted on studs 43, extending from opposite sides of the hub 1. The levers 41 and 42 are provided with the ball ends 44. The bearing housings 9 are each provided with lugs 45 projecting from opposite sides having ball ends 46 adjacent the corresponding ball ends of the equalizing levers. The corresponding ends of said lugs and levers are enclosed within tubular connecting links 47, having spherically curved seat members 50 pressed into engagement with the respective ball ends by an intervening spring 48. A castellated nut 51, having a spherical seat is screwed into each of the connecting links 47, and bears against the ball end of the adjacent lug. The connecting link is provided with a diametrical cotter pin bore 52, with which slots in the castellated nut 51 are aligned and a cotter pin holds the nut in adjusted position. By adjusting any one of the nuts 51, lost motion is eliminated from the entire equalizing mechanism.

The hub 1 is provided with the stops 53 spaced on opposite sides of the equalizing levers 41 and 42 just beyond the working range of movement of the blades, engageable by said equalizing levers to prevent any idle swing of the blades beyond their working range, when the motor is not running. Said stops may be cushioned as by the rubber pads 54.

The device whereby the pilot may increase or decrease the maximum R. P. M. consists of rocker arms 55, one on each side, pivoted on the studs 43 and having at one end an adjustable stop 56 which by rocking of the arm 55 may be made to encroach upon the normal automatic working range of the blades by engaging the equalizing levers 41 and 42, by which the blades may be moved into a low pitch position beyond the limits of their automatic action, thereby attaining the desired increase in the R. P. M. of the motor. By adjustment of the stop 56, the angle of the blades in this low pitch position, and the consequent maximum R. P. M. may be adjusted to the best advantage of an individual motor and the conditions under which it is being used.

A spring 57 connected to the rocker arm 55 and anchored to the hub normally keeps the stop 56 outside of the working range of the blades. The end of the rocker arm 55 opposite the stop 56 is provided with a cup-shaped socket 66. The means for operating the rocker arms 55 will now be described.

The hub 1 has an extension 58 externally rabbeted to provide a shoulder 59, and threaded at its outer end. An annular boss 60 carrying a circular plate 61 is keyed onto the rabbeted extension 58 and abuts the shoulder 59. A ring nut 62 is screwed upon the end of the hub into firm contact with the boss 60. Levers 63 are intermediately pivoted to the inner side of the plate 61 at opposite points 64. Said levers are crank-shaped so that while the inner part of each moves adjacent the inner face of the plate 61, the outer part extends through a hole 62' in the plate 61 to the outer side of said plate, the holes being large enough to allow the necessary movement of the levers 63 about their pivots. The outer ends of the levers 63 are provided with cup-shaped sockets 65, each having their open end of the cup directed toward the open end of the socket 66 of the corresponding rocker arm 55. Ball-ended connecting rods 67 are seated at their respective ends in the sockets 65 and 66 so that the rocker arms 55 are operated through movement of the levers 63.

A cam 68 is journaled upon the boss 60, resting against the inner side of the plate 61. This cam, as shown in Figure 4, is oval in its outer peripheral contour, having slight depressions 69 at the opposite ends of its minor axis and similar depressions 70 at the opposite ends of its major axis. These depressions form seats for the anti-friction rollers 71 in the inner ends of the levers 63, and determine definite positions not only of the cam with respect to the levers, but of the levers and rocker arms. The springs 57 keep the rollers pressed against the cam.

The cam 68 has an internal recess 72 (see Figures 7 and 8) the peripheral wall of which is formed with ratchet teeth 73 corresponding in number to the detent depressions 69 and 70.

A drum housing, designated as a whole by the numeral 74, encloses the cam 68. This comprises a sleeve portion 75 journaled on the boss 60 and terminating close to the cam 68 to hold the latter in place and yet permit of its free rotation. The ring nut 62 retains the drum housing in place. Said housing further comprises a back plate 76 centrally recessed for the reception of a spring 77, and a peripheral flange 78 which is a brake drum, the free end of which preferably overlies the peripheral edge of the plate 61 with sliding clearance.

The sleeve portion 75 extends into the recess 72 of the cam 68 and carries the oppositely disposed pivoted pawls 79 (see particularly Figure 8), which cooperate with the ratchet teeth 73, being kept against the peripheral wall of the recess 72 in the cam, by centrifugal force when the propeller is turning.

The drum housing carries a lug 80 projecting inwardly toward the axis of the hub 1, and the plate 61, which is keyed to the hub, carries spaced stop lugs 81 and 82 on opposite sides of the lug 80 and in the path of relative movement of the lug 80. The sides of the lugs 81 and 82 engaged by the lug 80 are preferably cushioned, as by the rubber pads 83.

It will be understood that all of the mechanism of the R. P. M. changing device described up to this point normally rotates with the hub, and that there is therefore normally no relative movement between any of its parts. Movement of the stops 56 to R. P. M. increasing position is accomplished by momentary retardation of the movement of certain parts relative to others, in this wise.

A lined brake band 84 surrounds the brake drum 78. This brake drum is supported by a ring 85 bolted to the motor. The means for mounting the brake band is conventional. One end has an eye 86 surrounding a post 87 on the ring 85. The other carries a lug 88 connected to a spring 89 anchored to the ring 85, the purpose of the spring being to keep the brake band separated and normally out of contact with the brake drum. Spaced lugs 90 projecting from the ring 85 keep the brake band circular and centered when relaxed. The brake band is contracted against the drum by means such as the Bowden wire 91, connected to an adjustable stud 92 carried by a lug 93 pivoted to the lug 88. The Bowden wire has an operating knob 94 convenient to the pilot.

The mode of operation is as follows. Assuming that the stops 56 are in the inactive position shown in Figure 3, so that the self-pitch changing operation of the blades is unimpeded throughout their normal working range by which the R. P. M. is maintained constant at cruising speed, under these conditions all parts of the device within the brake band and its mounting are rotating together with the hub (in a counterclockwise direction in all of the figures), therefore, they are relatively stationary. In this position the lug 80 is against the lug 81, having been brought to this position by the expansive force of the spring 77, one end of which is connected to the ring nut 62 on the hub at 95, Figure 7, the other end being connected to the drum housing at 96, Figure 7. The pilot, wishing to switch to the higher order of R. P. M., applies the brake to the brake drum. This retards the speed of the brake drum, causing the lugs 81 and 82 which travel with the hub, to move counterclockwise relative to the lug 80. This relative movement is only momentary, for as soon as the lug 82 catches up with the lug 80 the drum housing 75 is then driven at hub speed through the engagement of the lug 82 with the lug 80, regardless of when the pilot releases the brake. As the lug 82 moves toward the lug 80, the spring 77 is wound in a potential position to expand as soon as the brake is released. When this occurs, the brake housing flies forward in a counterclockwise direction, being stopped by reengagement of the lug 80 with the lug 81.

As shown in Figure 4, the cam 68 is detained in a position in which the rollers 71 of the levers 63 are in their innermost position, in line with the short axis of the cam 68. The outer ends of said levers are then in their outermost position, permitting the springs 57 to hold the stops 56 out of the normal range of movement of the equalizing levers 41 and 42, permitting the full range of self pitch changing movement of the propeller blades. At this time the rollers 71 are pressed into the depressions 69 by the springs 57, compelling the cam 68 to rotate with the hub. Now, when the drum housing 75 is retarded relative to the hub by application of the brake, the pawls 79 carried by the drum housing are likewise retarded, and since they are engaged with ratchet teeth 73 of the cam 68, said cam is also retarded. Since the levers 63 move with the hub, the rollers 71 are drawn out of the depression 69 and travel around against the cam 68 in a counterclockwise direction until they seat in the depressions 70 at the ends of the long axis of the cam.

The lugs 81 and 82 are so spaced relative to the lug 80 that the lug 82 engages the lug 80, positively driving the brake housing at hub speed, simultaneously with the seating of the rollers in the depression 70, so that there is then no relative movement between the cam and rollers and the latter remains seated in the depressions 70. When the rollers are so positioned, the inner ends of the levers 63 are in their outermost positions, which brings the outer ends of said levers to thrust the connecting rods 67, Figure 3, against the cupped ends of the locking levers 55, tilting them to bring the stops 56 into the normal path of movement of the equalizing levers 41 and 42. The range of self pitch changing movement of the blades in a pitch increasing direction is thus limited and the higher order of R. P. M. thereby secured.

The transfer of the rollers 71 from one set of depressions to the next is responsive solely to the application of the brake and is unaffected by the time of release of the brake. If the brake is held applied beyond the moment of engagement of the lugs 82 with the lug 80, this simply results in the brake drum 78 rotating frictionally against the brake band at the speed of the propeller. When the brake is released, the pawls 79, together with the drum housing, fly forward in a counterclockwise direction until they fall behind the shoulders of the next tooth 73, where they remain in readiness to retard the cam 68 when the brake is again applied.

Since the spring 77 is anchored to the ring nut 62 it has the effect of keeping the ring nut in tight engagement with the hub.

Figures 10 and 11 show a modification of the invention by which the R. P. M. of the motor may be stepped up by two stages. This can be accomplished by changing the pitch or setting of the cam so as to provide more than two stages on the cam for the rollers 71, at different distances from the axis of the hub 1. In these figures the cam 97 is circular in external contour and mounted eccentrically with respect to the hub axis, thus providing a short radius $g$, a long radius $h$, and equal radii $i$ of intermediate length, quadrantly displaced. Detent depressions 98, 99 and 100 are formed in the face of the cam at the ends of these radii. A single pivoted lever 63 is employed instead of the duplicate lever arrangement present in the first described form of the invention. This makes necessary the employment of only one of the connecting rods 67 and rocking levers 55.

When the roller 71 is in the depression 98, the stop 56 is furthest removed from the equalizing lever 42 and the propeller blades are free to perform their self operating pitch changing movement throughout their entire working range. When the roller is in either of the depressions 100, the stop 56 is shifted into the path of movement of the equalizing levers 42, blocking the greater part or probably all of the automatic range, thus slightly increasing the R. P. M. under certain conditions. When the roller is in the depression 99, the stop 56 will have moved the blades by contact with the equalizing lever 42 to a low pitch position beyond the limits of the automatic adjusting range, thus ensuring a considerably higher R. P. M. of the motor for taking off, or at any other time desired.

Since the rollers 71 must pass through the intermediate stations in proceeding from the minimum to maximum R. P. M. positions, the pilot must apply the brake twice in shifting from cruising R. P. M. to maximum R. P. M. and twice to return from maximum R. P. M. to cruising R. P. M.

Advantage is taken in Figures 10 and 11 to show a structure reversed with respect to the first described form of the invention to the extent that the cam carries the pawls 79, while the teeth 73 are carried by the brake drum housing In this modification the teeth 73 are formed on the inner face of a ring 101 which is riveted at 102, or otherwise secured to the back plate 103 of the drum housing. The cam 97, as shown, terminates in a plane inner face, and the sleeve portion 104 of the drum housing is of such length as to place the ring outside of the plane of the inner face of the cam. The pawl 79 has a shank 105 pivoted in a bore which opens in the inner face of the cam so that the pawl projects beyond said inner face, within the ring 101, and engages the teeth on the inner face thereof through centrifugal force.

The operation does not differ from that of the first described form. When the brake is applied, the speed of the ring 101, which is carried by the drum housing is retarded, the teeth 73 in the path of the pawl acting as a stop for the cam, the speed of which is thereby retarded, causing the roller 71 which is moved at hub speed to leave the depression 98, at which moment the lug 82 engages the lug 80 and the whole assembly then travels at hub speed.

In that form of the invention shown in Figures 12, 13 and 14, an oval cam 106 is provided coaxial with the hub 1, employing a pair of levers 107 oppositely pivoted to a plate which is keyed to the hub. Retardation of the cam is produced, as in Figure 10, by pawls carried by the cam, engageable with teeth carried by the brake drum housing. That which is new in this modification is that the depressed seats for the rollers which determine the positions of the swing of the levers 107, are on the inside face of the cam instead of on the outside face, as in Figure 4. As the rollers are pressed against the cam by the springs 57, Figure 1, and these always urge the outer ends of the levers outwardly with respect to the hub axis, it follows that the rollers 71 must be located intermediate the ends of the levers 107, in order to reverse the direction of pressure of the rollers with respect to the cam.

Since the embodiment of this modification requires some change in the form and disposition of certain of the parts, these are described in detail as follows. The boss 108, carrying the disk plate 109, is keyed to the rabbeted end portion of the extension of the hub 1, with the disk toward the hub. The drum housing 110 comprises a sleeve 111 journaled on the boss 108, of such length as to extend substantially to the disk plate 109. Said sleeve is integral with a circular back plate 112, which lies substantially in the plane of the end of said boss. The ring nut 62 retains the drum housing in position on the boss. Said ring nut is screwed tight against the boss, but permits the drum housing to rotate. The back plate 112 has an integral peripheral flange 113, the free end of which overlies the disk plate 109, with clearance. The flange 113 is the brake drum.

A ring 114 is riveted or otherwise secured to the drum housing, coaxial with the hub, having the teeth 73 on its inner periphery. The cam 106 has a peripheral portion 115, the full width of the distance between the disk plate 109 and the back plate 112, with enough clearance to permit rotation. The side of the cam facing the disk plate has a central oval recess 116, the peripheral wall of which is formed with the roller depressions 69 at the ends of its short axis and the roller depressions 70 at the ends of its long axis. The cam is provided on the same side, with a concentric wider recess to make room for the levers 107 which are pivoted to the disk plate 109 and operate within the confines of the cam, with the rollers 71 extending into the recess 116.

That face of the cam 106 which lies against the back plate 112 is formed with the oppositely positioned recesses 118 opening in the outer periphery of the cam confronting the ring 114, for receiving the pawls 79. Said pawls in operation are extended beyond the periphery of the cam and into contact with the inner periphery of the ring 114 by centrifugal force. They are engaged by the teeth 73 on the ring 114. The shanks of the pawls 79 are pivoted in bores formed in the bottoms of the recesses 118.

The other elements of structure present in this modification and not specifically described in connection therewith, are substantially identical with corresponding features present in the first described form of the invention, and the mode of operation is substantially the same.

If desired, the control means, as described, could be arranged to operate the propeller entirely as a controllable pitch propeller. This could readily be done by adjusting the blades in the fittings 29, so that the equalizing levers would in all flight conditions contact the stops 56 when in the released position. This would be the low R. P. M. controlled position. If the cam were operated to move the stops 56 in the opposite direction, it would then hold the blades in the controlled low pitch position. Similar intermediate positions could be arranged, as desired, by adding additional ratchet teeth 73 and corresponding stopping positions on the cam, arranging the stops 81 and 82 to allow the correct amount of rotation.

This propeller would work equally well as a controllable pitch propeller if the blades were adjusted to a very low pitch in their normal operating position, then forced into the higher pitch position by the use of the cam adjusting unit. This would require merely reversing the projecting ends of the levers 63 to the opposite sides of the hub and reversing the rocker arms to cause the stops 56 to bear against the opposite ends of the equalizing levers 41 and 42.

While I have in the above description disclosed what I believe to be a preferred and practical embodiment of the invention, it will be understood to those skilled in the art that the specific details of construction and arrangement of parts, as shown and described, are by way of illustration and not as limiting the scope of the invention.

What I claim as my invention is:

1. Self-operating pitch changing propeller for automatically maintaining constant R. P. M., including a hub and blades movable with respect thereto through a range of pitch angles under the resultant of the centrifugal and aerodynamic forces affecting said blades and means for narrowing or obliterating the automatic range of pitch changing movement of said blades, said means comprising a stop interposable into the path of movement of an element movable with said blades, in a direction to oppose pitch increasing movement of said blades, normally spring biased out of said path of movement, a plate fixed relative to said hub to rotate coaxially therewith, a lever mounted on said plate, a cam journaled coaxially relative to said hub pressed by said lever, normally rotated with said hub through engagement by said lever, having high and low points successively engaged by said lever for moving the latter to operate or release said stop, a cam operating member including a brake drum, journaled coaxially relative to said hub, a projection on said cam operating member, spaced lugs on said plate engageable by said projection defining a range of relative movement between said cam operating member and plate, a spring between said cam operating member and plate normally holding said projection against the leading lug, a fixedly supported brake band, means operable at will for applying said band to said drum for retarding said cam operating member causing relative rotation contra to the bias of said spring until the trailing lug engages said projection whereupon said cam operating member and plate move together at hub speed against friction of said brake band, a pawl and ratchet connection between said cam and cam operating member retarding said cam synchronously with the retardation of said cam operating member, said lugs being so positioned and spaced as to cause said lever to move from one of said cam points to the next responsive to a single act of brake pressure, said spring when the brake band is released restoring said plate and cam operating member to their original relative positions without moving said cam.

2. Self-operating pitch changing propeller for automatically maintaining constant R. P. M., including a hub and opposite blades movable with respect thereto through a range of pitch angles under the resultant of the centrifugal and aerodynamic forces affecting said blades, pitch equalizing levers connecting said blades, and means for narrowing or obliterating the automatic range of pitch changing movement of said blades, said means comprising a stop pivotally mounted on the hub interposable in the path of movement of an equalizing lever in a direction to oppose the pitch increasing movement of said blades, a spring at one end of said stop biasing it out of the path of movement of said equalizing lever, a plate fixed relative to said hub to rotate coaxially therewith, a lever mounted on said plate, a connection between said lever and the opposite end of said stop, a cam journaled coaxially relative to said hub, pressed by said lever through force transmitted from said stop spring, said cam normally rotating with said hub through engagement by said lever, having high and low points successively engaged by said lever for moving the latter to operate or release said stop, a cam operating member including a brake drum, journaled coaxially relative to said hub, a projection on said cam operating member, spaced lugs on said plate engageable by said projection defining a range of relative movement between said cam operating member and plate, a spring between said cam operating member and plate normally holding said projection against the leading lug, a fixedly supported brake band, means operable at will for applying said band to said drum for retarding said cam operating member causing relative rotation contra to the bias of said spring until the trailing lug engages said projection whereupon said cam operating member and plate move together at hub speed against friction of said brake band, a pawl and ratchet connection between said cam and cam operating member retarding said cam synchronously with the retardation of said cam operating member, said lugs being so positioned and spaced as to cause said lever to move from one of said cam points to the next responsive to a single act of brake pressure, said spring when the brake band is released restoring said plate and cam operating member to their original relative positions without moving said cam.

3. Self-operating pitch changing propeller as claimed in claim 1, said cam being eccentrically mounted, having high and low points at the opposite ends of its axis of throw and opposite intermediate points therebetween whereby more than one order of R. P. M. may be obtained.

4. In a bearing construction for rotatable propeller blades, in combination, a stub shaft, a hollow bearing member fitting on said stub shaft and secured thereto, said stub shaft having a conical threaded bore opening in its outer end, the annular wall defined by said bore being longitudinally split in the zone encompassed by said bearing cone and formed with circumferentially displaced recesses extending across the end thereof outside of said zone, a tapered plug screwing in said bore for expanding said split wall, said plug extending above said zone, and having its extended end formed with recesses adapted to register with the end recesses of said wall, a washer seated upon the end of said bearing member in overlapping relation thereto, formed with a peripheral series of indents and having a tongue adapted to extend through registering recesses of said wall and plug, and securing means for said washer carried by said bearing member engaging in certain of said peripheral indents.

ROY E. SHARPES.

REFERENCES CITED

The following references are of record in the file of this patent:

UNITED STATES PATENTS

| Number | Name | Date |
|---|---|---|
| 1,455,442 | Leparmentier | May 15, 1923 |
| 1,851,874 | Seppeler | Mar. 29, 1932 |
| 1,885,487 | Squires | Nov. 1, 1932 |
| 1,956,055 | Wiegand | Apr. 24, 1934 |
| 2,008,865 | Havill et al. | July 23, 1935 |
| 2,117,062 | Jablonsky | May 10, 1938 |
| 2,144,927 | Levasseur | Jan. 24, 1939 |
| 2,192,034 | Driggs | Feb. 27, 1940 |
| 2,234,196 | Prewitt | Mar. 11, 1941 |
| 2,250,826 | Everts | July 29, 1941 |
| 2,282,077 | Moore | May 5, 1942 |
| 2,359,265 | Hackethal et al. | Sept. 26, 1944 |

FOREIGN PATENTS

| Number | Country | Date |
|---|---|---|
| 287,985 | Italy | Aug. 21, 1931 |
| 684,120 | France | June 21, 1930 |